Oct. 25, 1960
J. KUHARSKI
2,957,214
EXOTHERMIC WELDING METHOD
Filed Nov. 26, 1958
3 Sheets-Sheet 2
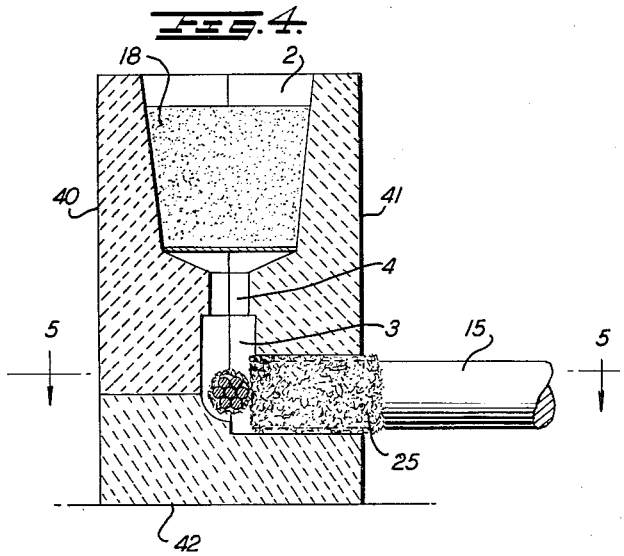
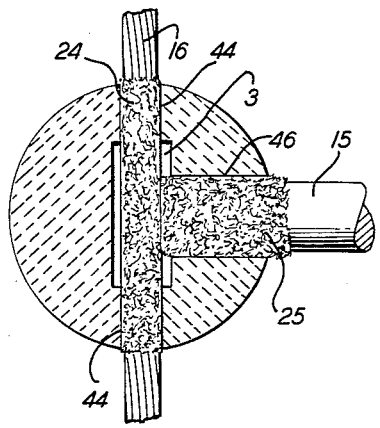
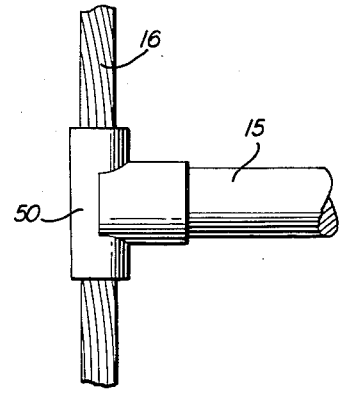
INVENTOR:
John Kuharski
BY Albert H. Kirchner
ATTORNEY Oct. 25, 1960
J. KUHARSKI
2,957,214
EXOTHERMIC WELDING METHOD
Filed Nov. 26, 1958
3 Sheets-Sheet 3
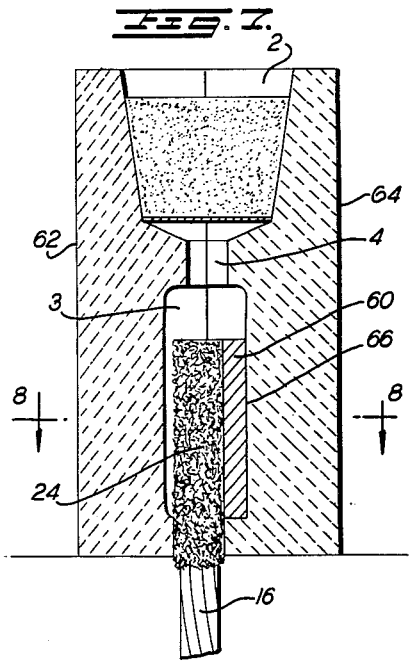
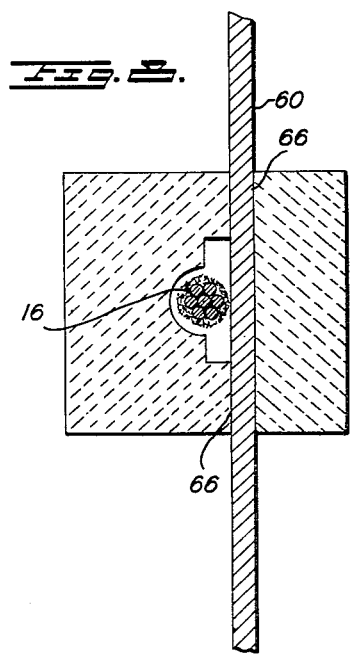
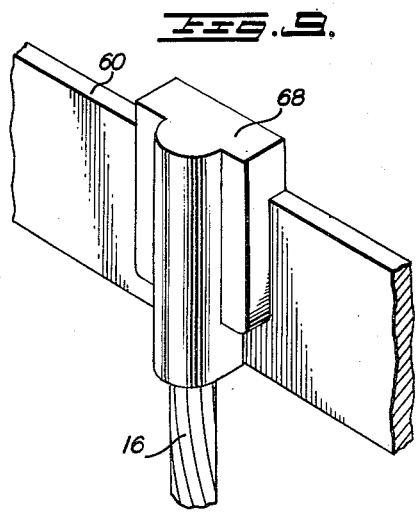
INVENTOR:
John Kuharski
BY Albert H. Kirchner
ATTORNEY United States Patent Office 2,957,214
Patented Oct. 25, 1960

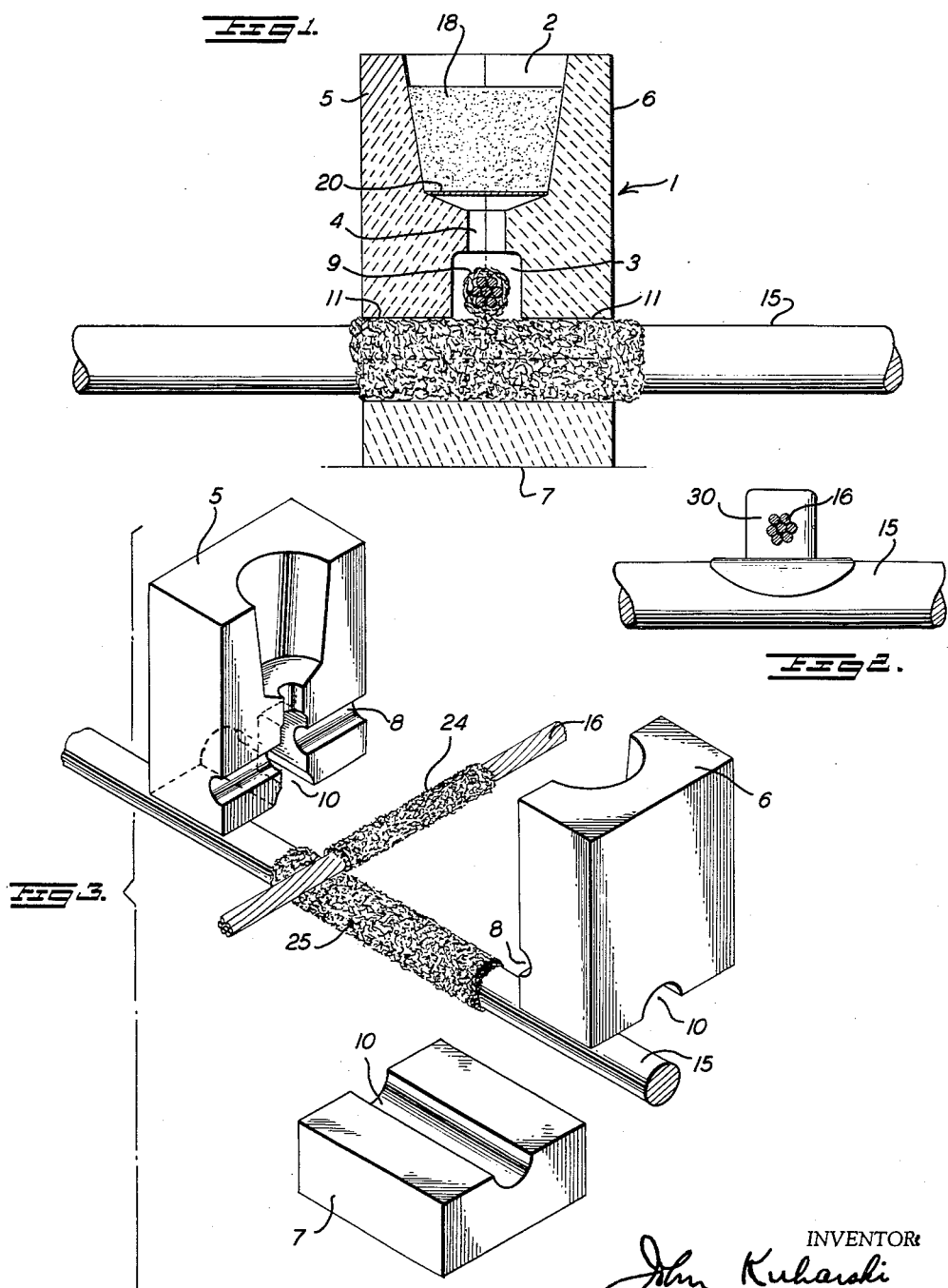

2,957,214
EXOTHERMIC WELDING METHOD

John Kuharski, Tulsa, Okla., assignor to Continental Industries, Inc., Tulsa, Okla., a corporation of Oklahoma Filed Nov. 26, 1958, Ser. No. 776,599
2 Claims. (Cl. 22—203)

The present invention relates to welding methods and more particularly, although not exclusively, to exothermic welding, and a principal object of the invention is to provide a method and means for making quickly, efficiently and inexpensively good welded connections between metal members of varying and different cross sectional shapes and sizes by the use of the same molding equipment.

The invention has special reference to exothermic welding procedures, sometimes called thermite or thermit welding, of the type in which a mixture of finely divided aluminum and some metallic oxide, such as copper oxide, is ignited in a crucible for reaction with violent evolution of heat to produce molten metal which is conducted through a bottom sprue into a mold cavity to cool and solidify in welding relation with two or more metal parts that are positioned in the cavity. In the practice of such welding where, as is generally the case, one or both of the two metal members that are to be welded together is elongated so that it must project at one or both ends from the mold, which of course is confined to the immediate area to be welded, considerable difficulty is experienced in fitting the projecting area sufficiently tightly in the mold wall opening to hold the molten weld metal in the cavity and keep it, or excessive quantities of it, from escaping through the opening and being lost and wasted and/or producing a welded connection of poor quality and appearance requiring trimming and removal of the excess weld metal.

The problem is particularly acute where the attempt is made to use a single mold successively on elongated and hence projecting metal members of varying cross sectional sizes and shapes, as where rods, cables, buses or the like of different diameters are to be welded in succession to other such parts or to flat surfaces, and where such parts of the same rated size or gauge are found actually to vary in size by reason of manufacturing tolerances.

A special case of the latter kind to which the invention has particularly important application is the problem constantly faced by the building construction industry in the welding of copper ground cable to steel reinforcing rod or bar stock. These rods or bars are configured on their outer surfaces with a lacing of crossing spiral ribs or grooves designed to enhance the bond to be made with the concrete that is poured around the rods, and this irregularity of surface makes it virtually impossible for the area of the bar which projects through the mold wall opening to make sufficiently snug engagement with the wall to hold molten weld metal in the cavity. The difficulty is aggravated by the wide range of diameter tolerance of these roughly made bars by which, for example, a No. 9 bar, which is rated at one and one-eighth inch diameter may have a diameter as large as one and three-sixteenths inches.

The best prior art methods of solving the problem have involved caulking the opening with "Duxseal" and winding thin copper shim stock around the bar. For a number of reasons well known to the practical art both methods are unsatisfactory. Thus, for example, they are slow and costly to practice and they frequently result in porous and otherwise inferior welds, non-uniform welds, waste of metal, etc.

The principal object of the present invention is to provide an improved method by which all such welds as cable to rod, plate, bus or the like, or cable to cable, or bus to bus, plate to plate, and others, can be made uniformly, quickly, inexpensively and of the highest quality by the use of exothermic mixes in a combined crucible and mold.

A related object is to provide a technique of the kind described capable of being used in other molding methods, not involving exothermic reactions, in which molten metal is poured into a mold cavity or the equivalent into which an elongated metal member extends through a mold wall opening in which for any reason it may not normally fit in good leakproof relation.

A further object is to provide the foregoing type of method for use in the welding of protruding metal members of such large diameter or cross section as to undergo so much expansion on becoming heated by contact with the molten weld metal as to subject the mold wall to cracking stress.

Other objects and advantages will, it is believed, be apparent to those skilled in the art from the following description of certain preferred embodiments of the invention that are illustrated by the accompanying drawings in which Figure 1 is a vertical cross sectional view through a combined crucible and mold used in practicing the new method in thermit welding the intermediate portion of a cable to the intermediate portion of a bar, both of which are shown in position in the mold, with a charge of exothermically reacting mix in the crucible;

Fig. 2 is a side elevational view of the bar of Fig. 1, showing the finished weld in side elevation and the cable in cross section;

Fig. 3 is an exploded perspective view of the parts of the apparatus and the metal members of Fig. 1;

Fig. 4 is a view like that of Fig. 1 but showing a combined crucible and mold used in practicing the invention in thermit welding the intermediate portion of a cable to an end of a bar;

Fig. 5 is a cross sectional view taken on the line 5—5 of Fig. 4;

Fig. 6 is a plan view of the finished weld produced by the apparatus and method of Figs. 4 and 5;

Fig. 7 is a view like those of Figs. 1 and 4 but showing a combined crucible and mold used in practicing the invention in thermit welding the end portion of a cable to an edge margin of a plate;

Fig. 8 is a cross sectional view taken on the line 8—8 of Fig. 7; and

Fig. 9 is a perspective view of the finished weld produced by the apparatus and method of Figs. 7 and 8.

In these figures, and referring first to the embodiment of the invention illustrated by Figs. 1–3, the reference numeral 1 designates generally a combination crucible and mold of generally conventional known construction used in thermit welding. It may consist of a refractory material such as graphite or graphitic composition molded into generally block-like shape as shown to provide an upper open-topped chamber 2 which serves as the crucible and a lower chamber 3 constituting the mold cavity, with a relatively narrow port 4 connecting the two chambers and serving as the tap or sprue passageway. The mold 1 selected to illustrate the first of three exemplary embodiments of the invention, is intended to be used in welding together the intermediate portions of lengths of bar or rod stock and cable, and for this reason the block is made in separable parts all provided with mating grooves or half-openings, as best shown in Fig. 3. This arrangement is for the purpose of adapting the block parts to be fitted around those portions of the two metal members that are to be joined in the weld and to permit the other portions of the members to protrude from the block, as will be understood from the figures. A convenient division of the block is into the three parts shown in Fig. 3, consisting of two otherwise identical but relatively reversed upper halves 5 and 6 and a bottom element 7. The inner faces of the two halves are adapted to make snug engagement with each other, and each of them is formed with a pair of half-grooves 8 adapted to combine, when the halves are fitted together, to form the full round or cylindrical openings 9, 9 which establish communication of the upper portion of the mold cavity 3 with the exterior of the block. Similarly, each of the two halves has a bottom face adapted to fit snugly on the top face of the bottom element 7, and the bottom face of each half and the top face of the bottom element are each formed with a half groove 10, all of which are so located as to combine, when the two halves are properly mounted on the bottom element, to provide the full round or cylindrical openings 11 which establish communication of the lower portion of the mold cavity with the exterior of the block.

As will be observed in Figs. 1 and 2, the area of a length of rod or bar stock 15 to which a length of cable 16 is to be welded is positioned in the lower opening 11 of the assembled block elements, and the cable 16 is positioned in the upper opening 8, with its area to be welded and the area of the bar to be welded both centered in the mold cavity 3. The crucible 2 is charged with a suitable thermit or equivalent exothermic mix 18 supported in the crucible chamber on a thin, fusible disc 20 so that, upon ignition of the mix and the ensuing fusion at high temperature, the disc will be melted out and the molten metal, which is generally copper in welds for electrical uses, will run down through the sprue or tap 4 and fill or substantially fill the mold cavity 3 so as to surround the junction of the two metal members 15 and 16 and, upon cooling, solidify into a good welded bond.

In accordance with the principles of the present invention, the openings 9 and 11 in the mold block walls, either or both of them, are larger in cross sectional shape and size than the metal member which is to extend through them, and the intervening space between the surface of the block material that forms the opening and the surface of the metal member in the opening is filled with a layer of metal wool that is wrapped around the member.

In the drawings both members are shown wrapped with metal wool, at 24 on the cable 16 and at 25 on the rod 15. The wrapping is preferably applied throughout the whole length of the member that is intended to lie between the two outside wall surfaces of the block 1, so that all of the member that lies within the mold cavity 3 and all of it that lies within the wall opening 9 or 11 is covered.

The wrapping may be of any metallic or other wool that is capable of forming a fairly dense mat when gently compressed around the member and which will melt or otherwise disintegrate when contacted by the molten weld metal. I have found that conventional steel wool and ordinary copper wool are well suited to the purpose. These materials consist of thick sheets of fine filaments of metal felted together into layers of relatively soft, spongy mass that can be torn readily by hand or can be cut manually by a knife or shears. It is a simple matter to estimate the length required to fit around a metal member 15 or 16 in a single convolution or preferably in several turns so as, when compressed by the closing of the groove halves on it, to fill the grooves sufficiently for the purpose of the invention.

This purpose is to stop the flow of molten weld metal out of the mold cavity 3 and through the opening 9 or 11 just long enough to permit the weld metal to cool to hardening temperature.

It is found that when the metallic wool is properly applied (which may be regarded as comprising application in any density sufficient to prevent the flow of molten weld metal entirely through the block wall), the wool within the mold cavity melts or otherwise disintegrates as the result of the high heat generated in the cavity by the incoming molten weld metal. The surfaces of the two metal members 15 and 16 are thus exposed to the weld metal and the bond effected on cooling is fully as good as any that would have been made had no wool been present. The wool in the opening 9 or 11, however, is slower to melt because the temperatures there do not rise as high as in the mold cavity. Hence the weld metal penetrates only a relatively short distance in the wall opening, consequent upon melting or other disintegration of the wool before the advancing weld metal, before it cools to solidifying temperature. At this point, of course, the flow of weld metal ceases and the wool has completed its function.

When the weld metal had fully hardened the block is opened and the welded members removed. They are found to be bonded in intimate union by a block of weld metal 30, with some remnants of the wool filaments adhering to the edges of the weld metal. These may, if desired, be removed readily by any convenient means, as by manually pulling them off or by stiff wire brushing, although of course for many purposes this is not necessary, as for example when the welded connection is an electrical ground that is to be buried in concrete.

Figs. 4–6 show a modified type of mold-crucible block useful in welding the intermediate portion of a cable 16 to the end of a piece of rod or bar stock 15. Here the block comprises two halves 40, 41 and a bottom element 42, all provided with mating flat faces and with half-grooves and indentations adapted, when the three elements are assembled, to form the crucible 2, sprue 4 and mold cavity 3, as heretofore described in connection with Figs. 1–3, as well as two wall openings 44 for the cable and a single wall opening 46 for the rod, as is believed to be clear from Figs. 4 and 5.

The members 15 and/or 16 are wrapped with metallic or equivalent wool 24, 25 as heretofore explained, and the result is the welded connection 50, the under side of which is shown in Fig. 6. It will be understood that the upper side is similar except that some sprue length of weld metal may be formed, depending on how much weld metal was charged into the mold cavity.

Figs. 7–9 illustrate a further modified form of block which is used in welding the intermediate portion of a plate 60 to the end portion of a cable 16. Here the block consists simply of two halves 62, 64, no bottom element being required. The halves are generally similar, both having the mating surfaces impressed with half-grooves and indentations to form the usual crucible 2, sprue or tap 4 and mold cavity 3. However, in this case, the two halves are differently configured on their mating faces to accommodate the cable end 16, which enters up through the bottom zones of the two halves, and the plate 60, which penetrates both of the opposite side walls of one of the halves, as shown in Figs. 7 and 8. Of course both members have portions lying in substantial contact in the mold cavity, and either or both of them will be wrapped with the wool 24. Figs. 7 and 8 show only the cable so wrapped, it being assumed that the openings 66 fit the plate 60 closely enough to prevent leakage of weld metal excessively beyond the mold cavity, but it will be understood that the plate too may be wrapped with wool. Wrapping would be necessary if the block shown in Figs. 7 and 8 were to be used on a plate of smaller size or cross section than the plate 60, which would be an example of one of the important advantages of the invention: the adapting of a single mold-crucible block to be used on metal members of different cross sectional size or shape.

Fig. 9 shows the appearance of the weld 68 produced by the block of Figs. 7 and 8.

With reference to the appended claims which recite the use of "metallic" wool for wrapping the metal members, it is to be understood that the essential functions of the wool are simply to impede the flow of molten metal long enough to permit the metal to cool to solidification in the mold cavity or after penetration only a relatively short distance into the wall opening, less than completely through it, and to melt or otherwise disintegrate within the mold cavity so as not to impair the contact of the weld metal with the surfaces of the members to be welded. It is recognized that these functions may be performed by wool made of material other than metal, and all such materials are to be deemed the full equivalent of metal and hence their use in the method is regarded as within the spirit of the invention and the scope and purview of the broader of the appended claims.

It is to be understood also that, while the invention has been illustrated and described in a form appropriate for practice in exothermic or thermit welding, in which weld metal powder is fused in a crucible integrally connected with the mold cavity, the invention is readily capable of being practiced in other types of welding. Thus, for example, the weld metal could be melted outside the block which contains the mold cavity and poured into the cavity, in which case of course there would be no need for the block to contain a crucible. Moreover, the melting need not be done exothermically, and the weld metal need not be of any of the thermit compositions. The broader of the appended claims are to be construed in the light of the foregoing considerations.

Finally, it will be recognized that the essence of the invention resides in wrapping the portions of the members that are to be enclosed within the wall openings rather than those portions that are to be located within the mold cavity. The latter portions really require no wrapping and could well be left unwrapped without loss of any of the advantages to be gained by practicing the invention. However, the metallic or equivalent wool is very inexpensive, especially in the small quantities required, and it is generally cheaper and more efficient to wrap excessively, including portions of the members that will lie in the mold cavity, than to attempt to limit the wrapping accurately to those portions that will lie within the block walls. It is possible to be thus wasteful, so to speak, in the use of the wool because of the important property of the wool by which those portions within the mold cavity promptly and completely melt or otherwise disintegrate upon contact with the very hot molten weld metal, so that no harm is done by these portions, while those portions of the wool that are in the wall openings, being contacted by cooler molten metal which is actually nearing solidification temperature, are slow to melt and thus perform their function of impeding the flow of weld metal until the metal solidifies.

I claim:

1. In the method of welding to each other two metallic members of the class wherein at least one of the members is relatively elongated and both members are mounted in ultimately desired juxtaposed relation in a refractory mold cavity with the elongated member protruding therefrom through an opening in the wall thereof and molten weld metal is conducted through a sprue passage into the mold cavity, the novel steps in said method of first wrapping a portion of the surface of the elongated member with a packing of matted metalic wool, setting the elongated member in the mold cavity in ultimately deseired juxtaposed relation with the other member and with the wrapped portion of the surface positioned in the wall opening with the packing engaged with the wall surface defining the opening and compressed thereby to sufficient density to impede the flow of molten metal from the cavity through said opening and prevent escape thereof from the mold, then pouring molten metal into the cavity in contact with the wrapped portion so that the molten metal will contact the surface of the other member within the cavity and will melt enough of the metallic wool to penetrate the wrapping of the elongated member and solidify in welded engagement with the two members before enough of the metallic wool within the wall opening becomes melted to allow escape of metal from the mold.

2. In the method of exothermically welding to each other two metallic members of the class wherein at least one of the members is relatively elongated and both members are mounted in ultimately desired juxtaposed relation in a refractory mold cavity with the elongated member protruding therefrom through an opening in the wall thereof and an exothermic welding mix is fused in a crucible above the cavity and is charged into the cavity through a sprue passage, the novel steps in said method of first wrapping a portion of the surface of the elongated member with a packing of matted metallic wool, setting the elongated member in the mold cavity beneath the crucible with the wrapped portion of the surface positioned in the wall opening and with the packing engaged with the wall surface defining the opening and compressed thereby to sufficient density to impede the flow of molten metal from the cavity through said opening and prevent escape thereof from the mold, igniting an exothermic mix in the crucible, thereby causing molten metal to flow from the crucible into the cavity in contact with the wrapped portion of the elongated member so that the molten metal will contact also the surface of the other member within the cavity and will melt enough of the metallic wool to penetrate the wrapping of the elongated member and solidify in welded engagement with the two members before enough of the metallic wool within the wall opening becomes melted to allowed escape of metal from the mold.

References Cited in the file of this patent

UNITED STATES PATENTS

| | | |
|---|---|---|
| 443,536 | Norman | Dec. 30, 1890 |
| 927,166 | Reid | July 6, 1909 |
| 1,235,071 | Sodervall et al. | July 31, 1917 |
| 1,649,139 | Sonen | Nov. 15, 1927 |
| 1,982,732 | Fletcher et al. | Dec. 4, 1934 |
| 2,241,355 | Maclachlan | May 6, 1941 |
| 2,870,498 | Rejdak | Jan. 27, 1959 |
| 2,897,556 | Chini | Aug. 4, 1959 |